A. VOORHES.
Machine for Upsetting Tires.
No. 28,426.
Patented May 22, 1860.
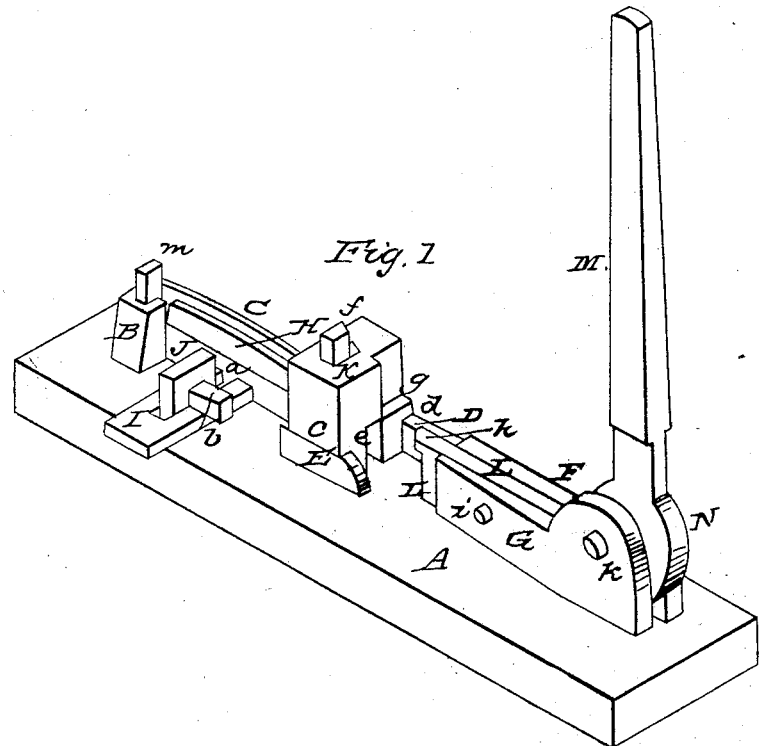
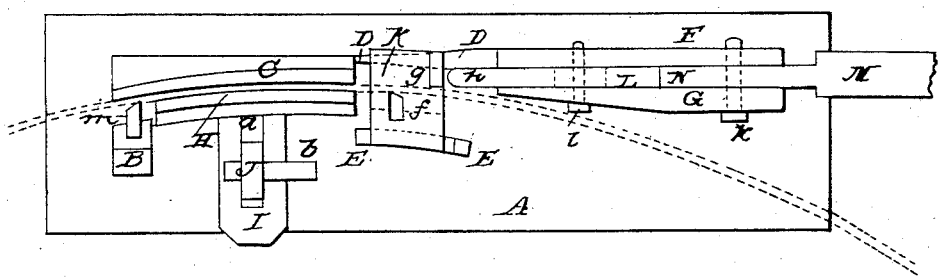
WITNESSES
E. Cohen
J. Hirsch
INVENTOR
Abraham Voorhes
per atty A. B. Stoughton

UNITED STATES PATENT OFFICE.

ABRAHAM VOORHEES, OF GRAND RAPIDS, MICHIGAN.

SHORTENING TIRES.

Specification of Letters Patent No. 28,426, dated May 22, 1860.

*To all whom it may concern:*

Be it known that I, ABRAHAM VOORHEES, of Grand Rapids, in the county of Kent and State of Michigan, have invented certain new and useful Improvements in Machines for Upsetting and Shortening Iron, such as Wagon-Tires and other Such Things; and I do hereby declare the following to be a full, clear, and exact description of the construction and operation of the same, reference being had to the accompanying drawings, making a part of this specification, in which—

Figure 1, represents a perspective view of the machine, complete, and Fig. 2, represents a top plan of the same.

Similar letters of reference where they occur in the separate figures, denote like parts of the machine in both.

I am aware that very many of these tire upsetting machines have been devised and patented. But they are too intricate, too expensive—or both, to go into general use.

I do not allege that I have discovered a better machine than any one else, but I do state that, it is as good as the best, and far cheaper than any other machine of which I have any knowledge for a similar purpose.

My invention relates to the simple, cheap, and efficient, plan on which I have arranged and constructed the several parts, as will be explained in connection with the accompanying drawings.

A represents a bed or base, which may be a stout plank or stick of timber upon which the whole apparatus may be arranged. The pieces or parts B, C, D, E, F and G, are permanently and strongly attached to the bed piece A.

H is a movable and adjustable clamp piece, of a curved form so as to tightly hold between itself and its fellow clamp piece C, the tire, or piece of iron to be upset.

I, is a shank piece connected to H. It is furnished with a slot $a$, so as to move past the stud J, and when the clamp piece H is adjusted, a wedge shaped key $b$ is driven through a mortise in the stud J, and thus firmly holds the tire between the clamps.

K is an anvil or upsetting block. It is shaped as shown in the drawing. The shoulders $c$, $d$ being for supporting and guiding said block on the ways or guides D, E; the mortise $e$ is for the tire to pass through.

The key $f$, is for clamping the block to the tire or other piece of iron, at or near the point where the upsetting is to be done, the recess $g$ is for the projection $h$ on the slide L, that moves said block H, to take into, to prevent said block from rising off from its ways.

The slide L, moves between two guide pieces F G. It is secured between said pieces, so that it may move longitudinally, but not rise vertically by means of a pin $i$, that passes through the guides, and through a slot in the slide L.

M is a lever, having its fulcra on the pin $k$. This lever has a cam N, on its short end, which cam when the lever is brought down from a perpendicular to a horizontal position takes against the end of the slide L, and drives it and the blocks with it, with great force, toward the clamp pieces C, H, and by this means upsets or shortens the tire or piece of iron operated upon.

$m$, is dove tail key for clamping the tire or piece of iron between a staunch block B, and the end of the clamp piece C, to prevent any moving of the piece of iron to be operated upon.

The machine I have shown is designed for upsetting or shortening wagon tires and hence the parts are made in a curved form of course straight bars or pieces of iron may be similarly upset, by clamping them in straight clamps.

It may be proper to state that the key $f$, may extend below the top of the bed of the machine, and that an opening should be made in the bed for the key to project into—and this opening must be long enough to allow the key and the anvil block to which it is secured, to move when the force of the lever M is applied to it.

The operation is as follows: The tire that is to be upset or shortened (and which is represented in red lines in Fig. 2) is tightly clamped between C and H, and the key $m$ driven down against it. The block K is set on its ways, just beyond the point or part to be upset, and its key $f$, tightly driven down. Bring down the lever M, which through its cam or eccentric drives the slide L against the block K and forces the block clamped to the tire, toward the clamps C, H. The unclamped portion of the metal being thus driven against the clamped portion it is upset and shortened. Of course the tire or piece of iron may be heated before operating upon it—and the upsetting be at one two or more places in the piece as preferred. The machine, too, may be made of iron, or of iron and wood combined. A very cheap machine may be made by making the bed and frame generally of wood, and those parts only of iron which have to withstand the strain in upsetting the bar or tire.

Having thus fully described the nature and object of my invention what I claim therein as new and desire to secure by Letters Patent is—

The arrangement of the clamping bars C, H, short clamping anvil block K, and detached lever or slide L, working between guides F, G, as herein set forth for the purpose of clamping and upsetting or shortening wagon tires as described and represented.

ABRAHAM VOORHEES.

Witnesses:
 WM. N. COOK,
 J. C. SIMONDS.